UNITED STATES PATENT OFFICE.

RENÉ BOHN, OF MANNHEIM, ASSIGNOR TO THE BADISCHE ANILIN AND SODA FABRIK, OF LUDWIGSHAFEN-ON-THE-RHINE, GERMANY.

GREEN-BLUE ALIZARIN DYE.

SPECIFICATION forming part of Letters Patent No. 502,603, dated August 1, 1893.

Application filed October 6, 1892. Serial No. 448,003. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of a Greenish-Blue Mordant Dyeing Coloring-Matter, of which the following is a specification.

In the United States Letters Patent Nos. 399,479, 399,480, 399,481, 399,482, 401,633, 401,634 and 401,635, granted to me, I have described various blue to green alizarin dyes which are all obtained by the action of sulfuric acid in a form or strength suitable for each case, upon certain dye-stuffs of the alizarin series. The dyes patented in these Letters Patent constitute very valuable articles of commerce.

My present invention relates to a new and improved coloring matter which yields beautiful pure green-blue shades with chrome mordanted sheep's wool fiber, and which seems to possess in some respects an even higher degree of utility than the dyes patented to me in my above mentioned Letters Patent and appears to be more easily applicable in dyeing so that comparatively unskilled labor can be employed when using it.

In the production of my new green-blue dye I start preferably from 1.4 dinitro-anthra-quinone and treat it with fuming sulfuric acid containing about twelve per cent. free anhydrid at a suitably high temperature, until a coloring matter easily soluble in water is produced. This constitutes the first stage of the process for the manufacture of my new dye.

Without separating or isolating the coloring matter contained in the product of the first step I dilute the whole melt or mixture with sufficient ordinary concentrated sulfuric acid to produce an acid of about monohydrated strength. With this I continue heating at a somewhat lower temperature, until my new dye is produced.

The temperatures of the treatments, the strengths of the acids and the duration of the processes above mentioned may be varied without departing from my invention. If the product of the first stage be isolated and the isolated product be separately further treated with concentrated sulfuric acid, then less greenish dyes are obtained than the dyestuff which is the subject of this application and no claim is made to such dyes in this application.

The production of soluble coloring matter from nitro-anthra-quinones by treatment thereof with fuming sulfuric acid alone, which proved to be valueless for dyeing purposes, has been described and published in the German Patent No. 6,526 to Przibram & Co., and this general treatment is employed as the first step in my process, but as said description is indefinite and since variations of the process affect that product, therefore I describe herein the entire process of preparing my new dyestuff, but I do not claim as my invention the said first step or the readily soluble product resulting therefrom.

The following directions will serve as an example of the manner in which the invention can be carried into effect and my new dye obtained. By parts I mean parts by weight.

Example: Mix about ten (10) parts of 1.4 di-nitro-anthra-quinone with about one hundred (100) parts of fuming sulfuric acid containing about twelve per cent. of free anhydrid, (12% $SO_3$); heat the mixture to a temperature of about one hundred and sixty degrees centigrade (160° c.) and maintain the heat for about one and a half to two hours, (1½ to 2 hrs.) So far the process resembles that of the German Patent No. 6,526 hereinbefore referred to. This known process can be advantageously modified by a change invented by me which consists in adding about one to two parts of sulphur to the mixture before heating. A coloring matter readily soluble in water is produced giving a dirty violet solution in water; without separating this product, dilute the melt with about two hundred (200) parts of ordinary concentrated sulfuric acid containing about ninety-five per cent. real acid (95% $H_2SO_4$). Now heat the mixture for about two (2) hours more at a temperature of about one hundred and thirty degrees centigrade (130° c.) or until the soluble intermediate product is converted into a coloring matter of the desired shade, which is comparatively speaking insoluble in water. Allow to cool, pour the mass into water, filter the precipitate and wash well with cold water. If desired, purify by dissolving in sodium acetate or some solution acting in a similar manner and precipitating with an acid.

My new dye, when dry, is a dark-colored powder which possesses the following properties: it is very slightly soluble in cold water, somewhat more soluble in boiling water, and the solution so obtained is blue violet in color and non-fluorescent; on adding alum to the aqueous solution the color changes to blue; it is soluble in alcohol giving a violet solution and is practically insoluble in ether and benzine; it is more particularly characterized by its behavior with concentrated sulfuric acid, anilin and glacial acetic acid, as solvents; it dissolves in concentrated sulfuric acid giving a red-brown solution, in anilin it is soluble in the cold, readily soluble on boiling, giving a beautiful blue solution; in cold glacial acetic acid it is almost insoluble, on boiling slightly more soluble and gives a solution of a red violet color.

My new dye can be applied to sheep's wool fiber not only with the aid of a chrome mordant but with any of the metallic mordants in ordinary use. If in the above example stronger fuming sulfuric acid be used (say for instance acid containing about forty per cent. free anhydrid (40% $SO_3$) then the same coloring matter results but admixed with one or more other dyes. The admixture so obtained dyes less greenish shades of blue than the dye itself such as can be obtained as the result of the aforesaid example.

What I claim as new, and desire to secure by Letters Patent, is—

The new greenish-blue alizarin dye hereinbefore described which can be derived by the successive treatment of di-nitro-anthra-quinone first with fuming and afterward with concentrated sulfuric acid and which when dry appears in the form of a dark-colored powder soluble in alcohol, practically insoluble in ether and benzene, slightly soluble in cold water, somewhat more soluble on boiling, giving a blue violet non-fluorescent solution which changes in color to blue on addition of an alum solution, substantially as described.

In testimony whereof I have hereunto set my hand in the presence of two subscribing witnesses.

RENÉ BOHN.

Witnesses:
ERNEST F. EHRHARDT,
CONRAD SCHRAUBE.